United States Patent
Arora et al.

(10) Patent No.: US 11,368,457 B2
(45) Date of Patent: Jun. 21, 2022

(54) DYNAMIC LEARNING SYSTEM FOR INTELLIGENT AUTHENTICATION

(71) Applicant: Visa International Service Association, San Francisco, CA (US)

(72) Inventors: Sunpreet Singh Arora, San Mateo, CA (US); Kim R. Wagner, Sunnyvale, CA (US); John F. Sheets, San Francisco, CA (US); Lacey Best-Rowden, San Mateo, CA (US)

(73) Assignee: Visa International Service Association, San Francisco, CA (US)

(*) Notice: Subject to any disclaimer, the term of this patent is extended or adjusted under 35 U.S.C. 154(b) by 506 days.

(21) Appl. No.: 16/049,669

(22) Filed: Jul. 30, 2018

(65) Prior Publication Data

US 2019/0260742 A1 Aug. 22, 2019

Related U.S. Application Data

(60) Provisional application No. 62/632,752, filed on Feb. 20, 2018.

(51) Int. Cl.
*H04L 29/06* (2006.01)
*G06N 3/04* (2006.01)
*G06N 3/08* (2006.01)

(52) U.S. Cl.
CPC ....... *H04L 63/0876* (2013.01); *G06N 3/0445* (2013.01); *G06N 3/0454* (2013.01); *G06N 3/08* (2013.01); *H04L 63/20* (2013.01)

(58) Field of Classification Search
USPC .......................................................... 726/1
See application file for complete search history.

(56) References Cited

U.S. PATENT DOCUMENTS 8,171,298 B2  5/2012  Ramaswamy et al.
9,160,726 B1  10/2015  Kaufman et al.
(Continued)

FOREIGN PATENT DOCUMENTS

WO  2010/133770 A1  11/2010
WO  2012/073250 A1  6/2012
(Continued)

OTHER PUBLICATIONS

Hochreiter, Sepp, and Jürgen Schmidhuber. "Long short-term memory." Neural computation 9.8 (1997): 1735-1780, 32 pages.
(Continued)

*Primary Examiner* — Sakinah White Taylor
(74) *Attorney, Agent, or Firm* — Kilpatrick Townsend & Stockton LLP

(57) ABSTRACT

Techniques for intelligently deciding the optimal authenticator(s) from amongst those supported by an electronic device are described. The authentication system according to some embodiments may include a dynamic machine learner that incorporates the attributes of: (i) user behavior attributes (e.g., preferred authenticator); (ii) device attributes (e.g., hardware and software specifications, applications, etc.); and (iii) operating environment attributes (e.g., ambient light, noise, etc.), as well as the interplay between the aforementioned attributes over time to make the decision. In some embodiments, the authentication activities and patterns of other users of similar type (e.g., users exhibiting similar behavior across different operating environments) can also be learned and employed to improve the decision making process over time.

17 Claims, 6 Drawing Sheets

(56) References Cited

U.S. PATENT DOCUMENTS

| | | | |
|---|---|---|---|
| 9,911,290 B1* | 3/2018 | Zalewski | G06Q 20/12 |
| 10,027,662 B1* | 7/2018 | Mutagi | G10L 15/22 |
| 10,735,411 B1* | 8/2020 | Hardt | G06N 20/00 |
| 10,853,738 B1* | 12/2020 | Dockendorf | G06N 3/088 |
| 2006/0253358 A1 | 11/2006 | Delgrosso et al. | |
| 2008/0172715 A1 | 7/2008 | Geiger et al. | |
| 2010/0317371 A1 | 12/2010 | Westerinen et al. | |
| 2011/0010761 A1 | 1/2011 | Doyle | |
| 2012/0137340 A1 | 5/2012 | Jakobsson et al. | |
| 2012/0271913 A1 | 10/2012 | Tallgren et al. | |
| 2013/0104187 A1 | 4/2013 | Weidner | |
| 2013/0232073 A1 | 9/2013 | Sheets et al. | |
| 2013/0252597 A1 | 9/2013 | Jin et al. | |
| 2013/0290136 A1 | 10/2013 | Sheets et al. | |
| 2014/0059645 A1* | 2/2014 | Hannel | H04L 63/105 726/3 |
| 2014/0143149 A1 | 5/2014 | Aissi | |
| 2014/0222678 A1 | 8/2014 | Sheets et al. | |
| 2015/0033305 A1* | 1/2015 | Shear | G06F 21/6218 726/6 |
| 2015/0324686 A1 | 11/2015 | Julian et al. | |
| 2016/0250486 A1* | 9/2016 | Yoder | A61N 1/37217 340/870.07 |
| 2016/0277380 A1 | 9/2016 | Wagner et al. | |
| 2017/0093920 A1 | 3/2017 | Ducatel et al. | |
| 2017/0126688 A1* | 5/2017 | Jones-McFadden | H04L 67/22 |
| 2017/0270530 A1 | 9/2017 | Sheets et al. | |
| 2017/0337478 A1 | 11/2017 | Sarikaya et al. | |
| 2018/0188938 A1* | 7/2018 | Deselaers | G06N 3/02 |
| 2019/0342195 A1* | 11/2019 | Mermoud | H04L 41/147 |

FOREIGN PATENT DOCUMENTS

| | | |
|---|---|---|
| WO | 2013/024278 A1 | 2/2013 |
| WO | 2013/024279 A1 | 2/2013 |
| WO | 2013/120723 A1 | 8/2013 |

OTHER PUBLICATIONS

Chung, Junyoung, et al. "Gated feedback recurrent neural networks." International Conference on Machine Learning. 2015, 9 pages.

Kingma, Diederik, and Jimmy Ba. "Adam: A method for stochastic optimization." arXiv preprint arXiv:1412.6980(2014).

Zeiler, Matthew D. "ADADELTA: an adaptive learning rate method." arXiv preprint arXiv:1212.5701 (2012), 6 pages.

Olah, Christopher, et al. "Understanding LSTM Networks" http://colah.github.io/posts/2015-08-Understanding-LSTMs/ (2015), 8 pages.

International Search Report and Written Opinion as dated May 7, 2019 for PCT Application No. PCT/US2019/014331, 12 pages.

* cited by examiner

DYNAMIC LEARNING SYSTEM FOR INTELLIGENT AUTHENTICATION

CROSS-REFERENCE TO RELATED APPLICATION

This disclosure claims priority to U.S. Provisional Patent Application Ser. No. 62/632,752, filed on Feb. 20, 2018, the entirety of which is incorporated herein by reference.

BACKGROUND

To enhance the security of electronic devices, such devices can be configured to require verification of authentication data before access to certain functionalities is granted. Some devices may provide various configuration options to allow a user to select the form of authentication data. For example, a mobile device can provide a screen lock to prevent unauthorized users from accessing information or applications stored on the mobile device, and the mobile device may allow a user to select between using a fingerprint or a passcode to unlock the screen. However, once the form of authentication data is set by the user, the selection is fixed and remains static until the user reconfigures the mobile device to use another form of authentication data. This can inconvenient the user, for example, if the selected form of authentication is not suitable for a particular environment that the user is subjected to. For example, if the mobile device is not within the reach of the user, fingerprint or passcode authentication may be difficult for the user to perform and may not be the best way to authenticate the user. Improved method for authenticating user to improve data security are needed.

Various embodiments of the invention address these and other problems, individually and collectively.

BRIEF SUMMARY

Embodiments of the present invention provide for methods, devices, and systems for a dynamic learning system for intelligent authentication. According to some embodiments, a computer-implemented process for optimizing device authentication by an electronic device may include receiving, by the electronic device, a request from a user to access the electronic device. When a request from the user to access the electronic device is received, the electronic device or a server in communication with the electronic device may select an authentication type based on user attributes, device attributes, and/or operating environment attributes using a set of heuristically determined authentication rules, and prompt the user for authentication data corresponding to the selected authentication type. Upon receiving the authentication data corresponding to the selected authentication type, the electronic device may grant permission for the user to access the electronic device based on verification of the received authentication data.

Another embodiment is directed to a method comprising receiving, by a processor, user attributes, device attributes, and/or operating environment attributes associated with a plurality of electronic devices. An authentication model comprising a set of heuristically determined authentication rules can be determined by the processor based at least upon the user attributes, device attributes, and/or operating environment attributes previously received. The processor can further receive a request to access an electronic device, and select a type of authentication based upon the request and the authentication model.

These and other embodiments of the invention are described in detail below. For example, other embodiments are directed to systems, devices, and computer readable media associated with methods described herein.

A better understanding of the nature and advantages of embodiments may be gained with reference to the following detailed description and the accompanying drawings.

DETAILED DESCRIPTION

Figure 1:
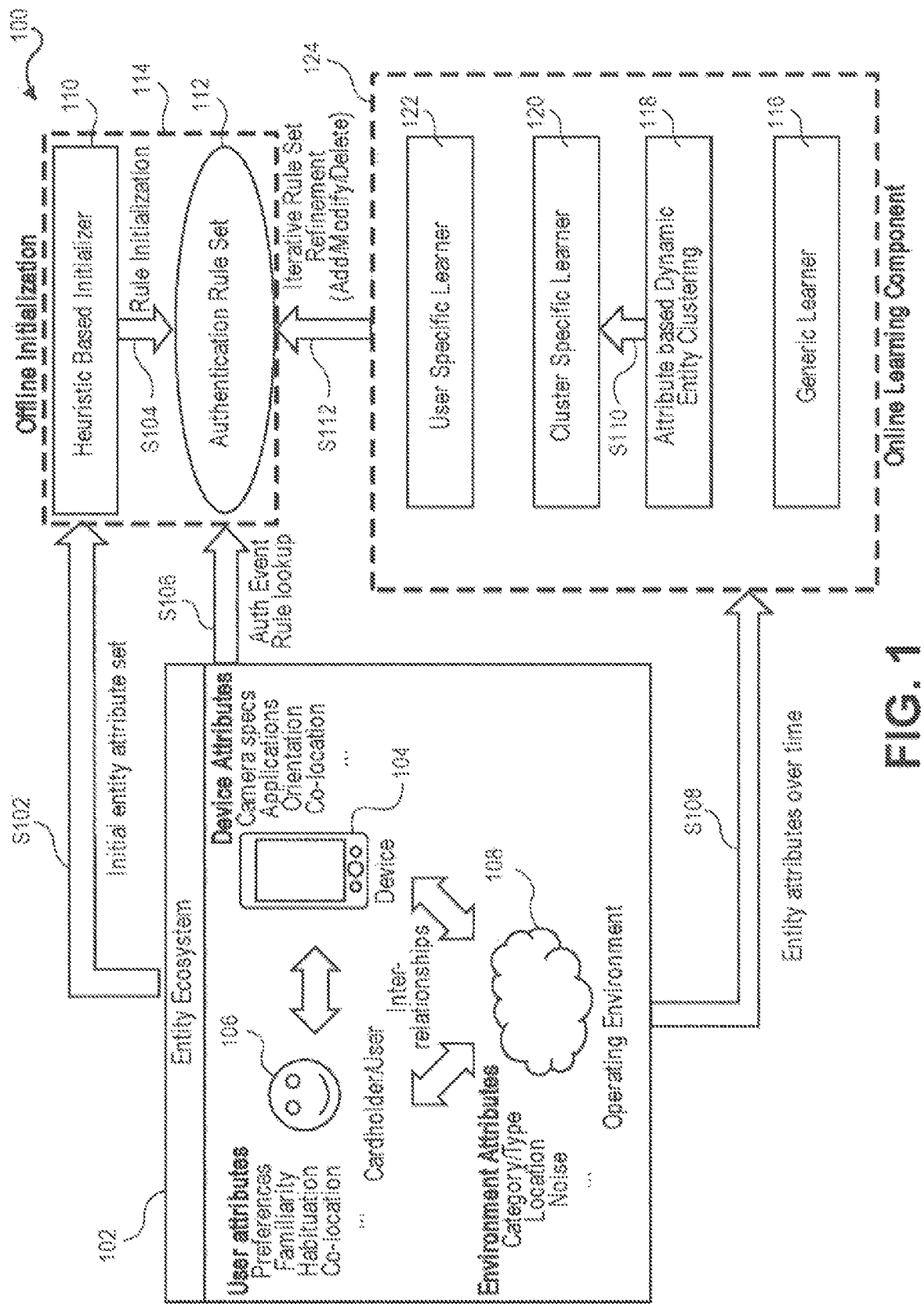
FIG. 1 illustrates a conceptual block diagram of a dynamic learning authentication system, according to some embodiments.

Techniques for intelligently deciding the optimal authenticator(s) from amongst those supported by an electronic device are described. The authentication system according to some embodiments may include a dynamic machine learner that incorporates the attributes of: (i) user behavior attributes (e.g. preferred authenticator); (ii) device attributes (e.g., hardware and software specifications, applications, etc.), and (iii) operating environment attributes (e.g., ambient light, noise, etc.), as well as the interplay between the aforementioned attributes over time to make the decision. In some embodiments, the authentication activities and patterns of other users of similar type (e.g., users exhibiting similar behavior across different operating environments) can also be learned and employed to improve the decision making process over time.

Prior to discussing specific embodiments of the invention, some terms may be described in detail.

A "user" can be a person or other entity that operates, uses, and/or controls something (e.g., an electronic device). A user may include an individual that may be associated with one or more personal accounts and/or electronic devices.

An "electronic device" may refer to a device that incorporates one or more electronic components. The one or more electronic components can be in the form of integrated circuits, and may implement one or more functional components such as a processor, memory, or other application specific integrated circuits Examples of an electronic device may include a communication device, a computing device, a mobile device, etc., or a combination thereof.

A "communication device" may refer to a device that can be used for communication. The communication device may directly or indirectly communicate with another device or another entity such as an individual or group. A communication device may provide remote or direct communication capabilities. Examples of remote communication capabilities include using a mobile phone (wireless) network, wireless data network (e.g., 3G, 4G or similar networks), Wi-Fi. Wi-Max, or any other communication medium that may provide access to a network such as the Internet or a private network Examples of communication devices include desktop computers, videogame consoles, mobile phones (e.g., cellular phones), PDAs, tablet computers, net books, laptop computers, personal music players, hand-held specialized readers, etc. Further examples of communication devices include wearable devices, such as smart watches, fitness bands, ankle bracelets, rings, earrings, etc., as well as automobiles with remote or direct communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device). In some examples, a communication device may be referred to as a "user device."

A "computing device" may include a device that includes one or more electronic components for processing data or information. The one or more electronic components may include one or more processors coupled to one or more computer readable and/or writable memories (e.g., implementing one or more storage devices and/or system memories). A computing device may be used to execute one or more software applications. A computing device may also implement multiple operating environments using hardware, software, firmware, or a combination thereof for running security sensitive applications Examples of computing devices may include computers, mobile devices, point-of-sale devices, security token devices, etc. Some computing devices such as point-of-sale devices and security token devices are specialized for conducting transactions.

A "mobile device" may include any electronic device that may be transported and operated by a user. The mobile device may provide communication capabilities for remote communication with a network. The mobile device may be configured to transmit and receive messages or communications to and from a server computer and display the messages on a display screen on the mobile device. Examples of mobile devices include mobile phones (e.g. cellular phones), PDAs, tablet computers, net books, laptop computers, personal music players, hand-held specialized readers etc In some examples, a mobile device may be referred to as a "user device."

A "user attribute" may be an attribute associated with a user. For example, a user may have attributes corresponding to particular preferences or activities when the user is being authenticated to gain access to a user device or to process a transaction via a user device. User attributes can include or be related to user preferences, authentication activity, habituation to a certain authenticator, colocation with other users, predictive behavior with respect to how familiar the user becomes with the use of certain authenticators (e.g., initial exploration of a new authenticator, only limited use of certain authenticators, increased use of particular authenticators over time), etc.

A "device attribute" may be an attribute associated with a device. For example, a device may have attributes corresponding to hardware components and software (e.g., applications) implemented by or within the device. Device attributes can include or be measured by camera specifications, battery levels, screen brightness, playback volume, magnetometers, BLE and wireless connections (e.g., geolocation and/or colocation), barometers, accelerometers, gyroscopes (e.g., orientation), microphones, time stamps, time-keeping devices, and other hardware and software settings, or components. The manufacturer, model, platform (e.g., operating system), and version of the device may also be considered device attributes.

An "operating environment attribute" may be an attribute associated with an environment. For example, an operating environment may have attributes associated with the environment in which the user is operating a user device. Such attributes may include location, ambient light, ambient noise, speed of travel turbulence of travel, etc. Some operating environment attributes can be sensed by the device but are considered environment attributes, because they can vary in different operating environments.

A "heuristically determined authentication rule" may be an authentication rule that is determined heuristically, such as through learning to improve performance. For example, a heuristically determined authentication rule can be a rule that is developed efficiently and used as an aid or a basis in developing a further refined authentication rule. An authentication rule that is determined heuristically may be considered a sufficient rule for application purposes. A heuristically determined authentication rule can be formed using a machine learning process in a dynamic fashion.

An "online learning component" may be hardware and/or software that applies learning technology in a network environment. For example, an online learning component can gather user data from multiple users to learn user preferences across a total user population, across a group of users with similar features, and/or for a specific user over time. In some examples, the online learning component can implement artificial neural networks (e.g., recurrent neural network) to define more accurately relationships between data sets for multiple users and a single user of the multiple users.

An "authentication model" may be a model used to determine if something is tru or valid. An authentication model can include one or more authentication rules (e.g., heuristically determined authentication rule). The authentication model can weigh, order/prioritize, reorder, delete, modify, add, or otherwise alter the authentication rules. In some examples, the authentication model can be a neural network or can be implemented using neural networks, decision trees, classifiers, or any combination of these. In some examples, the authentication model can include a Long Short Term Memory (LSTM) model. See. e.g., Olah, Christopher, et al. "Understanding LSTM Networks" http://colah.github.io/posts/2015-08-Understanding-LSTMs/ (2015).

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcodes, PINs, answers to security question(s), cryptographic responses to challenges, human and/or device signatures, etc.

An "authorizing entity" is an entity which can authorize or approve transactions. An authorizing entity may typically refer to a business entity (e.g., a bank) that maintains an account for a user and is capable of authorizing transactions such as payment transactions, for example the purchase of goods or services.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification Information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit In one example, the server computer may be a database server coupled to a Web server. The server computer may comprise one or more computational apparatuses and may use any of a variety of computing structures, arrangements, and compilations for servicing the requests from one or more client computers.

Electronic devices may offer different mechanisms to authenticate a user such as biometrics, passcode/PIN, etc. However, not every type of authentication is suitable for every user at all times. For example, voice authentication may not be suitable in a noisy environment. As another example, facial recognition may not be suitable in a dark environment. As a further example, manual PIN entry may not be suitable if the device is plugged in for charging and is out of reach of the user. Thus, while a user may set the electronic device to use a particular type of authentication mechanism, it may not always be feasible to use the particular authentication mechanism chosen by the user. Additionally, a user may not have the option to set the type of authentication mechanism or to use the type of authentication previously set by the user. For example, a transaction may request a specific type of authentication by default, whereas other types of authentication may be suitable to initiate and process the transaction. The same problem persists such that a certain type of authentication may not be feasible under certain conditions and in different environments.

In order to determine an optimal authentication mechanism for any particular situation, the authentication system according to some embodiments can dynamically learn the behavior of the user and take into account the different entities interacting with the system during authentication activities. In some embodiments, there can be three different entities primarily interacting with the dynamic learning system: (i) the user, (ii) the user's device, and (iii) the operating environment, where each entity can be associated with corresponding attributes.

Based on user attributes, device attributes, and operating environment attributes, a heuristic based initializer can initiate an authentication model including an authentication rule set. The rule set, being based on the various user and device attributes and operating environment; can include rules for different situations while taking into account a user's preferences. For example, although a user may prefer voice authentication or may set voice authentication as the default type of authentication on a user device, voice recognition may not be feasible in a noisy atmosphere. Thus, the authentication rule set may include a rule that defaults typical authentication processes to use voice authentication, but may override that rule with another rule or an exception to that rule when an operating environment is too noisy to use voice authentication. The authentication rule set can be employed when a user attempts to perform an authentication for accessing a device or for completing a transaction.

As previously described, embodiments can employ the heuristic based initializer to develop an authentication model including an authentication rule set for intelligently deciding the optimal authenticator(s) from amongst those supported by an electronic device. Certain embodiments can develop and/or further modify this authentication rule set using an online learning component. The online learning component can gather user data from multiple users to learn user preferences across a total user population, across a group of users with similar features, and/or for a specific user over time. In some examples, the online learning component can implement artificial neural networks (e.g., recurrent neural network) to more accurately determine the authentication rule set.

Embodiments provide for determining and requesting an optimal type of authentication method to authenticate a user for accessing a device or completing a transaction when subjected to various operating environmental conditions and personal user preference data. By determining an optimal type of authentication to use in certain scenarios, the authentication system can provide increased security for users by ensuring that the highest quality form of authentication is used. For example, in a dimly lit environment, the authentication system may not request iris authentication when a user has traditionally preferred iris identification or when the user has set default authentication to iris authentication. Instead, the authentication system, after determining that iris authentication may not be feasible (e.g., may result in poor detection causing repeated failed attempts at authentication), may request authentication using voice authentication or manually entering a PIN, for instance. Additionally, requesting the optimal mode of authentication from a user as determined by the authentication system can reduce the number of computational resources utilized by the authentication system by avoiding authentication attempts that are likely to fail.

FIG. 1 illustrates a conceptual block diagram of a dynamic learning authentication system 100, according to some embodiments. The authentication system 100 may include an entity ecosystem 102, a heuristic based initializer 110, a generic learner 116, a cluster specific learner 120, and a user specific learner 122 among other components.

Over time, the authentication system 100 can accumulate attributes of the user, device, and environment for each authentication attempt by a user. This cumulative attribute set can be used to intelligently refine the heuristics defined Initially including adding new heuristic rules, modifying existing rules, as well as deleting obsolete rules. For example, if the authentication system 100 observes that users are employing iris based authenticates over face based authenticators in low light environments, the authentication system 100 can add this rule to the heuristic set (e.g., refines the weight matrices of recurrent neural network(s) appropriately to reflect this). Accordingly, the authentication system 100 can be optimized using online learning over time using new data. Thus, if the recurrent neural network is trained in batch mode first, it can continue to actively learn in online learning mode while predicting a best authentication mode to request from a user or users.

Whenever an authentication event occurs (e.g., the user seeks to gain access to a user device or desires to authentication a transaction using the user device), the authentication system 100 can perform a lookup function. The lookup function can be based on entity attributes of the authentication event and what is already known about the user behavior (e.g., attributes within an entity ecosystem 102) to return an appropriate response.

Messages between the devices in FIG. 1 can use any suitable communication protocol including, but not limited to. File Transfer Protocol (FTP); Hypertext Transfer Protocol (HTTP); Secure Hypertext Transfer Protocol (HTTPS), Secure Socket Layer (SSL), ISO (e.g., ISO 8583) and/or the like.

I. ENTITY ECOSYSTEM—DATA GATHERING

An entity ecosystem 102 can gather heuristic data. The entity ecosystem 102 can include attributes for a user 106, a user device 104, and an operating environment 108. An entity ecosystem 102 can be attributed to each user, such that the entity ecosystem 102 can exist solely in relation to a single user, interrelationships can exist between the user 106, the user device 104, and the operating environment 108. For example, the user device 104 can determine the location of the user 106 because it can be assumed that the user 106 is near, is in possession of or is accessing content via the user device 104. Similarly, the operating environment 108 can be determined by hardware and software implemented on the user device 104 during various activities or inactivity of the user 106.

A user 106 within the entity ecosystem 102 may have attributes such as user preferences, authentication activity, habituation to a certain authenticator, colocation with other users, predictive behavior with respect to how familiar the user becomes with the use of certain authenticators (e.g., initial exploration of a new authenticator, only limited use of certain authenticators, increased use of particular authenticators over time), etc. For example, a user 106 may have a preference to perform authentication procedures using fingerprint authentication. As another example, a user 106 may be determined to be located physically distant but still near (e.g., within eyesight but out of arm's reach) the user device 104 or other authentication device.

A user device 104 may have attributes such as hardware (e.g. camera specifications), software applications, colocation with other devices (e.g., access device, other user devices), orientation, etc. For example, a sensor of the user device 104 can be an attribute and can be used to determine if the ambient lighting around the user 106 is sufficient for facial recognition, or if facial recognition authentication should include providing a flash via the camera flash to improve authentication quality BLE connections or wireless connections can be an attribute and can be used to geolocate a user 106 or collocate a user 106 amongst other users. As a further example, a microphone of the user device 104 can be an attribute and can be used to determine if the user 106 is in a suitable environment for voice authentication.

Accelerometers can be used to determine if the user device 104, and ultimately the user 106, is moving at a fast rate in which certain types of authentication may be preferred Accelerometers can help understand the movement of the user device 104 during the capture of biometrics and other identifications (e.g., authentication attempt/event). This can help determine why the capture of the biometrics can be imperfect, and therefore not the best suited mode of authentication. This can also help determine the user preferences of using particular authentication methods when the user 106 is in motion. Gyroscopes or gyrometers can be an attribute and can be used to determine if the user device 104 is stable for purposes of performing, for instance, authentication via iris authentication. Gyroscopes can determine the direction and orientation of the user device 104 during the capture of biometrics or other identifications. This can help improve the capturing of the biometrics as well as determine user preferences with respect to how the user device 104 is orientated.

An operating environment 108 may have attributes associated with the environment in which the user 106 is operating the user's device. Such attributes may include location, ambient light, ambient noise, speed of travel (accelerometer), etc. Note that some attributes can be sensed by the user device 104 but are considered environment attributes because they may vary with different operating environments. Some of the aforementioned user, device, and environment attributes may exhibit more dynamic behavior than others. For instance, device hardware attributes may be largely constant whereas user behavior may change gradually. Also in some situations, operating environment conditions can change drastically (e.g., ambient light from indoor versus outdoor) Both static and dynamic attributes of the three entities can be leveraged in the authentication system 100.

Measuring ambient light can help evaluate how well facial recognition software works at different levels of ambient light, and user preferences for using facial recognition technology (e.g., clicking selfie) at different levels of ambient light. Measuring ambient noise can help evaluate how well voice recognition technology works at different levels of ambient noise, and user preferences for using voice at different levels of ambient noise Determining the location of the user device 104 and user 106 during the an authentication event can help determine the preferences of the user 106 in using particular authentication types based on the location of the user 106 (e.g., at home, work, etc.).

The information gathered by the user device 104 relating to the user device 104, the user 106, and the operating environment 108 of the entity ecosystem 102 can be accumulated and transmitted to a heuristic based initializer 110 at step S102. In some examples, the attributes and other corresponding information related to the user device 104, the user 106, and the operating environment 108 can be transmitted periodically to the heuristic based initializer 110 (e.g., upon determination of the attribute(s)). The heuristic based initializer 110 can be hardware and/or software stored on an offline initialization component 114. The offline initialization component 114 can be a server device or server computer distinct and located remotely from but in electrical communication with the user device 104. In some examples, the offline initialization component 114 can be an application, module, or other software located within and implementable on the user device 104, such that the attributes and other heuristic information may not need to be transmitted remotely.

At step S104, the heuristic based initializer 110 can be used to build an initial set of heuristics based on what authenticator (e.g., type of authentication mechanism) is feasible, not feasible, or likely or not likely to capture high quality authentication data in a given context (e.g., in a noisy environment, the system should not prompt for voice-based authentication). The heuristic based initializer 110 can initialize the authentication system 100 in an offline training mode to develop an authentication rule set 112. The authentication rule set 112 can be stored within and/or implemented on the offline initialization component 114. The authentication rule set 112 can be based on the interrelationships between the attributes for the user device 104, the user 106, and the operating environment 108 as determined by the heuristic based initializer 110.

Each of the devices and components in the system in FIG. 1 may include one or more processors, and a computer readable medium. The computer readable medium may comprise code, executable by the one or more processors, for implementing a method comprising: receiving user attributes, device attributes, and/or operating environment attributes associated with a plurality of electronic devices; determining an authentication model comprising a set of heuristically determined authentication rules based at least upon the user attributes, device attributes, and/or operating environment attributes; receiving a request to access an electronic device; and selecting a type of authentication based upon the request and the authentication model

II. AUTHENTICATION RULES

In some examples, the authentication rule set 112 can include temporary or temporal rules. Temporary rules may be rules that are included or implemented within the authentication rule set 112 for a limited period of time. For example, a certain form of authentication may be requested to the user 106 when the user 106 is geolocated at a specific resort on vacation in another country. The user 106 may not expect to return to the resort after returning from vacation, so the authentication system 100 may safely remove the rule from the authentication rule set 112, or in the least, deprioritize the rule as compared to other rules within the authentication rule set 112. Temporal rules may often be associated with the cluster specific learner 120, such that the authentication rule set 112 may add or remove rules associated with various clusters when a user is added to or is removed from a cluster (discussed below). Temporal rules may be rules that are implemented based on time measurement (e.g., internal clock of the user device 104). For example, a rule may be based on the time of day or night that a user is typically active or inactive.

Some basic examples of heuristically determined authentication rules may include rules similar to the following;

Avoid authentication via iris or facial recognition when travelling at high speeds (e.g., as measured by an accelerometer) or during turbulence (e.g., as measure by a gyroscope).

Request PIN/CW authentication when the user 106 interacts with an access device in a public location (e.g., merchant PoS).

Avoid requesting facial recognition in dim ambient lighting. Alternatively, prioritize facial recognition in sufficient ambient lighting because the user 106 generally prefers facial recognition authentication.

Avoid requesting voice authentication when ambient noise is above a certain threshold.

Based on preference of the user 106, generally request fingerprint authentication.

Request voice authentication between 6 pm to 8 am, and request fingerprint authentication between 8 am and 6 pm.

Avoid requesting facial recognition if the user device 104 has a low quality camera (e.g., low camera resolution).

In some examples, the authentication rule set 112 can contain default rules prior to the initialization processes described in steps S102 and S104. For example, a set of default rules can be predefined within the authentication rule set 112 that would likely be applicable for a majority of users. This can provide a baseline for the user 106 during authentication events performed according to step S106. The default rules can be utilized while the heuristic based initializer 110 continues to gather data in an offline initialized mode for the development of the heuristically determined authentication rule set 112. The baseline rule set can provide the user device 104 with basic functionality to request, in the very least, not an ineffective type of authentication from the user 106. For some examples, default rules may be to not request iris recognition in the dark, to not request voice authentication when the ambient noise level is above a certain decibel threshold, or to attempt authentication via other authentication types after a certain number of failed attempts using one particular authentication type.

Each rule of the authentication rule set 112 can be invoked during various scenarios where each rule may be applicable. For example, rules pertaining to a noisy environment can be analyzed and implemented when the user 106 is located within a noisy operating environment. The same rules may not be analyzed or implemented when the operating environment 108 is not noisy.

At step S106, the user 106 initiates an authentication event, and the user device 104 performs an authentication event rule lookup using the authentication rule set 112. The user 106 can attempt to gain access to a user device or perform a transaction using a user device 104 that may require authentication. The user device 104 can receive the authentication attempt or request from the user 106 for purposes of determining that an authentication event has been initiated Upon an authentication attempt by the user 106, the user device 104 can request and/or select a preferred authentication rule or set of authentication rules. In preparation for determining an authentication type, the rules of the authentication rule set 112 can be previously developed according to the processes described in steps S102 and S104 (e.g., the latest rules in the authentication rule set 112 can be based on the most recently received user attributes, user device attributes, and entity attributes received by the offline initialization component 114). The offline initialization component 114, in response to the request by the user device 104, can transmit a rule or set of rules to the user device 104 from the authentication rule set so that the user device 104 can locally store and apply the rules based on the attributes measurable at the time of the authentication event to select an authentication type.

In some examples, the offline initialization component 114 can apply the authentication rule set 112 to determine and select an authentication type in response to the request received from the user device 104. In examples where the offline initialization component 114 applies the authentication rule set 112 to determine a selected authentication type, the offline initialization component 114 can transmit the selected authentication type to the user device 104. Once the user device 104 receives the rule or set of rules, determines the preferred authentication type, and/or receives the selected authentication type, the user device 104 can prompt the user 106 for authentication data corresponding to the selected authentication type. The user device 104 can then receive the authentication data corresponding to the selected authentication type. Based on the verification of the authentication data received by the user device 104 from the user 106, the user device 104 can grant permission for the user 106 to access the user device 104, and/or allow the user 106 via the user device 104 to process a transaction using the authentication data.

In some examples, as part of the request to receive an authentication rule or set of authentication rules in step S106, the user device 104 can transmit current user attributes, user device attributes, and operating attributes to the offline initialization component 114. Transmitting the current attributes of the entity ecosystem 102 can allow the offline initiatialization component 114 containing the authentication rule set 112 to transmit, in response, one or more heuristically-determined prioritized rules based on the attributes corresponding to the current authentication event as opposed to transmitting the entire rule set to then apply to the specific authentication event. This can save on computational resources for both the offline initialization component 114 and the user device 104 when they are in communication with each other during step S106. Furthermore, by reducing the amount of data being transmitted (e.g., data corresponding to the most applicable rules versus data corresponding to the entire rule set), the time for determining a best mode of authentication to request of the user 106 can be reduced.

In some examples, transmitting the current attributes from the user device 104 to the offline initialization component 114 can allow it to determine the best mode of authentication based on the latest rules. This can allow the user device 104 to receive, instead of the actual rule or rules to apply, the best mode of authentication to use from the offline initialization component 114. This can further reduce the amount of computational resources required for communicating an appropriate response to the user device 104 during an authentication event (e.g., an instruction to use a certain type of authentication requires less bandwidth than transmitting an entire rule set).

In some examples the authentication rule set 112 can be transmitted to the user device 104 from the offline initialization component 114 without being prompted by an authentication event. For example, the heuristically determined authentication rule set 112 as developed via steps S102 and S104 can be transmitted to the user device 104 prior to any authentication event. In this manner, the user device 104 can store the authentication rule set 112 locally in preparation of performing an authentication event so that communication with the offline initialization component 114 is not required at step S106. This way, the user device 104 can determine and select a best mode of authentication to request from the user 106 more quickly. Furthermore, the offline initialization component 114 can push the authentication rule set 112 or a portion thereof to the user device 104 when the authentication rule set 112 experiences a change. For example, if the authentication rule set 112 is modified (e.g., rules are added, updated, removed according to step S112 as described herein), upon detecting a modification to any rule, the offline initialization component 114 can transmit the modified rule(s) or entire rule set to the user device 104. This can allow the user device 104 to have an up-to-date rule set to apply for prompting a best mode of authentication from the user 106.

Upon receiving a best mode of authentication based on the heuristicaiiy determined authentication rule set 112, the user device 104 can request input from the user 106 corresponding to the best mode of authentication. The user 105 can provide the form of authentication requested by the user device 104 for purposes of accessing the user device 104 or authenticating a transaction using the user device 104. In some examples, the user 106 can override the requested best mode of authentication to use another form of available authentication. This override of the requested mode of authentication can be used as a learning event, which is further described herein with respect to the user specific learner 122 and step S112.

The heuristic based initializer 110 can analyze and combine one or more attributes pertaining to user device 104, user 106, and operating environment 108 to determine a single rule within the authentication rule set 112. For example, the user 106 may have a preference to use facial recognition authentication in a noisy, well-lit, non-moving and stable environment over other forms of authentication, which can be developed into a rule to request facial recognition authentication in a similar environment during an authentication event. As another example, the user 106 may have a preference to enter a PIN when in a dimly lit location and/or in a public place interacting with a merchant access device. Allowing the heuristic based initializer 110 to develop rules based on a combination attributes can produce more versatile rules that can be applicable in a number of scenarios and operating environments.

However, rule development via the heuristic based initializer 110 can result in rules that may be arbitrarily based on a variety of seemingly unrelated attributes. For example, the user 106 may have a preference to use voice authentication in a dimly lit environment, which may result in a rule that requests voice authentication when in a dimly lit environment. The rationale behind such a rule may be because the user 106 wants to gain access to and/or locate the user device 104 in a dark environment where the user 106 have difficulty seeing, or simply because the user 106 prefers to use voice authentication generally. Additionally, the heuristic based initializer 110 may not be able to optimize the various rules pertaining to different but simultaneously occurring operating environment attributes while also taking into account user attributes. For example, one valid applicable rule may propose requesting one form of authentication, while another valid applicable rule may propose requesting another form of authentication.

For this reason, an online learning component 124 can be implemented to refine the authentication rule set 112 for implementing rules that not only adhere to a specific user's preferences, but also have a rational basis for providing one particular mode of authentication over another. As such, the basic rules of the heuristically determined authentication rule set 112 exemplified above can be refined to provide a best mode of authentication in more precise implementations taking more factors into account (e.g., data of multiple users) in a given instance.

The initialization of the system is proposed to be done in offline mode to prevent the system from a "cold start" (i.e. without any prior knowledge), in other words, the system starts off with some prior knowledge about heuristics (e.g., if the ambient noise is above a certain fixed threshold don't use voice authenticate).

III. ONLINE LEARNING

As previously discussed, the initial authentication prompts to a user 106 as described in step S106 are based on the heuristically determined authentication rules. These initial prompts can be used to initialize weight matrices for the artificial neural network(s) (e.g., recurrent neural network(s)) that may be implemented by the online learning component 124 within the dynamic learning authentication system 100.

The online learning component 124 can be a server device or server computer distinct and located remotely from but in electrical communication with the user device 104 and the offline initialization component 114. In some examples, the online learning component 124 can be an application, module, or other software located within and implementable on the user device 104, such that the attributes of entity ecosystem 102 pertaining to the specific user may not need to be transmitted remotely for processing.

As noted above, the authentication system 100 can include an online learning component 124. The online learning component 124 can include a generic learner 116, attribute based dynamic entity clustering 118, a cluster specific learner 120, and a user specific learner 122. The generic learner 116, the attribute based dynamic entity clustering 118 the cluster specific learner 120, and the user specific learner 122 can be implemented as software or device modules within the online learning component 124.

The attributes of the entity ecosystem 102 can be transmitted to the online learning component 124 over time so that the online learning component 124 can modify and adapt the authentication rule set 112 to be better suited to the user 106 in various scenarios. For example, some of the basic rule examples as described above can be further refined to be implemented more precisely depending on the attributes of the entity ecosystem 102, such that each rule may become more specific Refining the authentication rule set 112 to include more specific rules can cause fewer rules to overlap and be in contention with other rules within the authentication rule set 112.

As a simple example, one heuristically determined authentication rule may exist that requests voice authentication in dim lighting and another heuristically determined authentication rule may exist that requests fingerprint authentication for completing a PoS transaction via a merchant access device. There is contention between these two rules when the user device 104 is within a dimly lit environment when attempting to authentication a PoS transaction. Through application of the online learning component 124, each rule may be further refined over time based on authentication events of the user 106 and multiple other users. For example, the first rule may be modified by the online learning component 124 to request voice authentication when in a dimly lit environment for purposes of being granted access to the user device 104 only during the hours of 10 pm and 6 am. The second rule may be modified by the online learning component 124 to always request fingerprint authentication over other forms of authentication when initiating a PoS transaction of a certain amount with a merchant access device in a public environment. While the modified rules still may overlap to some degree, the extent of the overlap is reduced such that a best mode of authentication can be identified more readily.

The modifications to the original heuristically determined rules can be based on continuous behaviors and authentication events of the user 106 (e.g., via user specific learner 122, similar users (e.g., via the cluster specific learner 120), and a total population of users (e.g., via the generic learner 116). Through implementation of the online learning component 124, rule conflicts can be minimized or avoided via rule refinement so that one most applicable rule can be developed and/or identified to request the best mode of authentication from the user 106. Furthermore, the online learning component 124, in addition to modifying the authentication rule set 112 to reduce the amount of overlap, can assign weights or priorities to the rules within the rule set to favor one applicable rule over another applicable rule.

At step S108, the entity ecosystem 102 can transmit, via the user device 104, various attributes of the user 106, the user device 104, and the operating environment 108 to the online learning component 124. The transmission from the user device 104 to the online learning component 124 can be performed in a number of ways. For example, the user device 104 can periodically transmit attributes to the online learning component 124 in predetermined intervals in a burst fashion. In some examples, the user device 104 can transmit attributes upon detecting a change in the attribute (e.g., operating environment 108 noise level increases). In some examples, the user device 104 can transmit attributes during an authentication event performed in step S106 where the resulting requested authentication type is a result of analyzing the attributes recorded and received during the authentication event.

The online learning component 124 can receive attributes corresponding to multiple users, user devices, and operating environments included in multiple entity ecosystems. In some examples, the entity ecosystems for each user can be connected to the online learning component 124 via a network. The authentication system 100 can employ the generic learner 116 to learn behaviors and patterns across a broader user population from other user's exhibiting similar behaviors In some embodiments, the authentication system 100 need not rely solely on behaviors of a particular user to improve that users authentication experience. The authentication system 100 can also holistically analyze the behaviors of a broader user population to learn and improve the overall authentication experience over time. To do this, the authentication model implemented by the authentication system 100 can be trained on the user preferences of the entire user population, then fine-tuned after deployment based on user behavior (e.g., trained locally on the user device 104 periodically).

For example, an entire population of ail users may prefer voice authentication over iris authentication, and may further prefer fingerprint authentication over voice authentication. The generic learner 116 can map the use of each individual user and develop a cumulative view of general user preferences. This accumulated view can be compared against the activities of a specific user to determine if the authentication events performed by that user's user device 104 are in alignment with the cumulative behavior of the overall population. For example, if the user 106 prefers iris authentication over any other authentication type, as shown by repeated use of iris authentication, the generic learner 116 can be attributed less importance (e.g., weight in a neural network) when determining an ultimate authentication rule set 112 during step S112.

The user specific learner 122 can be used to learn user behavior and patterns based on feedback from user devices for authentication events recorded by the authentication system 100. In other words, user-specific learning can be tied specifically to a particular user's preferences for modifying the authentication rule set 112 to be applicable to that specific user. Certain users may exhibit peculiar behaviors in certain scenarios distinct from other similar users and overall user population. For example, if the authentication system 100 prompts a user for authentication using a fingerprint authenticator, but the user 106 overrides the prompt and prefers to use iris authentication instead, the authentication system 100 records this event and uses it as a learning event. Learning events can be used to fine tune the authentication model via the user specific learner 122 so that each authentication rule set 112 is specific to each user as deployed on each specific user's device.

As an example of a learning event resulting in rule modification via the user specific learner 122, take the previously discussed example where the authentication system 100 avoids authentication via iris or facial recognition when the user 106 is travelling at high speeds. The user 106 may often travel via tram, such that an accelerometer of the user device 104 determines that the user 106 is travelling at high speeds. The basic heuristically determined rule may request a form of authentication different from facial recognition because the authentication system 100 may assume that the user's travelling speed correlates to inability to successfully or sufficiently capture facial authentication (e.g., user is driving, travel is turbulent, etc.). Over time, the user 106 may continually be faced with requests for an authentication type other than iris or facial authentication while travelling via train at high speeds. However, the user 106 may override the rule to provide facial authentication successfully while travelling at high speeds, contrary to the rule. In this example, as a result of the successful facial authentication at high travelling speed, the user specific learner 122 may modify, delete, or reprioritize the rule to accommodate the preferred behavior of the user 106.

Thus, the user specific learner 122 can learn after a first authentication event or subsequent repeated authentication events that contradict or circumvent the heuristically determined rule A contradicted rule can be modified such that the contradictory user behavior is preferred for future authentication attempts. Similarly, where a rule is not contradicted, the user specific learner 122 may notice a pattern of other user attributes, device attributes, or operating environment attributes continuously associated with a certain authentication event, and the user specific learner 122 may modify the corresponding rule to become more specific over time.

The cluster specific learner 120 can be used to learn authentication behaviors and patterns from other similar users to better tailor the authentication rule set 112 to specific types of users. Attribute based dynamic entity clustering 118 can be used to dynamically cluster users, devices, and operating environments based on their attributes over time. For example, users in a certain geography may be found to have certain authentication behaviors. The attribute based dynamic entity clustering 118 can detect such behaviors and attributes, and generate and merge clusters of users. Based on the dynamic nature of the attribute based dynamic entity clustering 118 (e.g., continually changing attributes and authentication behaviors), dusters can constantly be created, merged, updated, or deleted. The attribute based dynamic entity clustering 118 can relay the clusters to the cluster specific learner 120 at step S110. Based on the clusters received, the cluster specific learner 120 can then adapt the learning for each individual cluster. Techniques such as k-means, rank-order, hierarchical clustering, or others can be used. This can help provide an improved authentication experience based on how other similar users behave.

Clustering can be used to prevent concept drift. For example, the authentication system 100, via the generic learner 116, can be tuned to entity ecosystems of users that perform authentication attempts often. To the generic learner 116, the attributes associated with these users may appear to be commonplace and the norm, and therefore should be attributed more weight in the overall rule-making process. However, in reality, these users' attributes and behaviors may be abnormal as compared to the total population including infrequent users, and may only appear normal due to the frequency of their use of the authentication system 100. Therefore, if based solely on the frequent users' attributes and behaviors, an authentication rule set 112 for an infrequent user with different entity ecosystem attributes would be prejudiced, resulting in an ineffective rule set for that individual user. Thus, partitioning, or clustering, users into smaller groups of similar users can avoid such issues by grouping users based on key similarities.

A user 106 can be grouped into one or more clusters via attribute based dynamic entity clustering 118. For example, the user 106 may be in a cluster based on colocation with other users or geographic location such that users within that cluster (e.g., at a particular location) prefer fingerprint authentication. The same user 106 may simultaneously be in another cluster of users who prefer voice authentication when travelling at high speeds. The authentication rule set 112 for the user 106 can be based on the preferences and attributes of the users within each corresponding cluster. In the same way that two rules may be applicable to an authentication event for the user 106, two clusters may be applicable to a single authentication event. Thus, each cluster and each cluster's corresponding user preferences and attributes may be given different weights for developing the authentication rule set 112 depending on the similarities to the user 106.

For example, the user 106 may be in a cluster based on colocation with other users, but has noticeably different attributes (e.g., device attributes such as different model mobile device with low camera resolution) as compared to what is common throughout that cluster. Here, the user 106 would be an outlier within the cluster. Therefore, that cluster's preference for facial recognition may be given less weight as compared to the other applicable cluster(s) when determining the authentication rule set 112.

The same user 106 may also be in a second cluster that prefers fingerprint authentication at night. Assuming the user 106 continues to use fingerprint authentication at night similar to the users within that cluster, the preferences of the cluster would hold significant weight in determining which authentication type to request from the user 106 at night. If, however, the user specific learner 122 notices over time that the user 106 has begun to use PIN authentication at night instead of fingerprint, the preferences of the user 106 as determined by the user specific learner 122 may be given more weight as compared to the preferences of the cluster. This can also cause the cluster specific learner 120 to eventually recognize that the user 106 may be an outlier within the cluster. Thus, the cluster specific learner 120 can shift the user 106 out of the cluster over time until the user 106 is no longer a part of that cluster. Similarly, as described before, a cluster may be dynamic and may change over time independent of the behaviors and attributes of the user 106. For example, every user within the cluster using fingerprint authentication at night can start to use voice authentication, while the user 106 continues to use fingerprint Over time, the cluster specific learner will adapt the preferences of the cluster and eventually shift the user 106 out of the cluster.

As another example of clustering implemented within the online learning component 124, a user may have a preference for voice authentication or may have set the default authentication type to that of voice. One prioritized rule of the authentication rule set 112 may propose that voice authentication may be suitable as the best form of authentication because the ambient noise of a restaurant is very low, and therefore the device can detect a user's voice very clearly. However, the restaurant may be a fine dining experience, where a voice authentication may be considered undesirable for restaurant patrons including the user 105.

The online learning component 124 can overrule the prioritized rule for voice authentication when in a quiet atmosphere or modify the authentication rule set 112 to provide a more suitable form of authentication. For instance, the user device 104, via geolocation applications, may detect that the user 106 is currently located at the fine dining restaurant. The cluster specific learner 120 may have aggregated authentication preference data from multiple past and present restaurant patrons (e.g., a geolocated cluster), such that none or few of the users used voice authentication when geolocated at the restaurant. Another cluster may exist within the cluster specific learner 120 which may include user preference data from nearby users (e.g., via BLE communications), such that no proximate users are overriding the suggested authentication type to use voice authentication.

The user 106 attempting to provide authentication at the restaurant may be grouped into one or more of these clusters, which can suggest that the authentication system 100, via the authentication rule set 112, compare a potential different rule (e.g., to not use voice authentication) against the expected rule (e.g., use voice authentication because the environment is quiet) Weighing the potential rule against the expected rule can result in the authentication rule set 112 choosing to request a mode of authentication from the user 106 other than voice authentication, despite the users preference for voice authentication and despite the quiet ambience. Alternatively, the cluster specific learner 120 clusters may not be given as much weight as the default/preferred voice authentication rule if more users within the restaurant-geolocated cluster have overridden the requested non-voice authentication. As such, the online component may compare the potential different rule (e.g., to not use voice authentication) against the expected rule (e.g., use voice authentication because the environment is quiet) and determine that the best mode of authentication is still voice. Of course, the user 106 can override the suggested rule to perform any type of desired authentication, including voice authentication.

At step S112, the online learning component 124 can use an authentication model based on the user specific learner 122, the cluster specific learner 120, and the generic learner 116 to modify the authentication rule set 112. Prior to a first implementation of the online learning component 124 for a specific user, the authentication rule set 112 can be solely based on the heuristics determined from steps S102 and S104. Upon first implementation of the online learning component 124 for a specific user, the authentication rule set 112 can change from a solely heuristics-based rule set to an online adaptive rule set. This online adaptive rule set can be continuously modified over time through repetition of steps S108 through S112.

In some examples, the authentication model of the online learning component 124 can be implemented using one or more neural networks, such as a recurrent neural network. A recurrent neural network, as further described in FIGS. 2-7, can be useful in determining a best mode of authentication to request from a user because the overall timeline and time dependencies for multiple authentication events can be analyzed and considered.

In some examples, the generic learner 116, the cluster specific learner 120, and the user specific learner 122 can each be implemented using a neural network. Inputs to the generic learner 116 neural network can be attribute data corresponding to each entity ecosystem that is in electrical communication with the online learning component 124. Outputs of the generic learner 116 neural network can be user preferences for the total user population. Inputs to the duster specific learner 120 neural network can be attribute data corresponding to each entity ecosystem for each user within one or more clusters as determined by attribute based dynamic entity clustering 118. Outputs of the cluster specific learner 120 neural network can be user preferences for each cluster. Inputs to the user specific learner 122 neural network can be attribute data corresponding to a specific entity ecosystem 102 for the user 106 making the authentication attempt. Outputs of the user specific learner 122 neural network can be user preferences for each cluster. The outputs from each learner's neural network can be used to determine and modify the authentication rule set 112 during step S112.

In some examples, the outputs from the neural networks of the generic learner 116, the cluster specific learner 120, and the user specific learner 122 can be used as inputs to a final neural network that can weigh the learner outputs based on the interrelationships between each learner of the online learning component 124 for a particular user. Thus, the outputs (e.g., preferences) of the learner with the most weight can affect the development and modification of the authentication rule set 112 more so than the outputs of the other learners.

In some examples, the generic learner 116, the duster specific learner 120 and the user specific learner 122 can be implemented in a single neural network. The generic learner 116, the cluster specific learner 120, and the user specific learner 122 can each be a layer of the single neural network that defines the authentication model. For example, the generic learner 116 can be implemented on a first layer of the neural network, the cluster specific learner 120 can be implemented on a second layer of the neural network, and the user specific learner 122 can be implemented on a third layer of the neural network. The inputs described above for each learner can be input to the single neural network at each respective layer.

As previously described, the authentication rule set 112 can be initiated and/or developed using a hierarchical implementation of the combination of the offline initialization component 114 and the online learning component 124. For example, the heuristic based initializer 110 can initialize the authentication rule set 112 as described in steps S102 and S104. The user 106 can operate in an offline training mode indefinitely and perform authentication events performed in step S106. The user 106 or user device 104 can initiate the online learning component 124 of the authentication system 100 to refine the authentication rule set 112 for that particular user. The online learning component 124 can receive the attributes of the entity ecosystem 102 in step S108. The generic learner 116, after receiving attributes from a number of users, can be trained to provide a user preference across the total population of user. The cluster specific learner 120, via attribute based dynamic entity clustering 118 in step S110, can be trained to group users of the total population of users into categories based on similar attributes, and identify preferences amongst users for each cluster. The user specific learner 122 can be trained independently from the other learners (e.g., the online learning component 124 has only received data from the user 106), or can be trained during or after the training of the other learners. In step S112, the online learning component 124 can modify the authentication rule set 112 for future authentication events performed by the user device 104 in step S106.

In some embodiments, steps S102 through S112 can be implemented in any conceivable order. For example, the online learning component 124 may have an abundance of data from multiple users, and the generic learner 116 may be able to determine a set of preferences across the general population of multiple users. Thus, step S112 may be performed prior to or at the same time as other steps, such that the generic learner 116 may provide a default authentication rule set for a new user prior to that user sending entity ecosystem attributes in step S108. This default authentication rule set can then be adjusted over time based on the additional processes described in steps S102 through S110.

In some examples, the various devices (e.g., user device 104, offline initialization component 114, online learning component 124) and their components depicted in FIG. 1 can be combined and executed in any conceivable combination. For example, the components shown in FIG. 1 (e.g.,) can be integrated into a single structure that can perform offline initialization, rule initialization, and online learning. In another example, the components shown in FIG. 1 can be distributed (e.g., in separate housings) and in electrical communication with each other. As another example, the user device 104 can implement the heuristic based initializer 110 and authentication rule set 112. As a further example, the generic learner 116, attribute based dynamic entity clustering 118, the cluster specific learner 120, and the user specific learner 122 can each be modules implemented on different servers that are in communication with each other.

Figure 2:
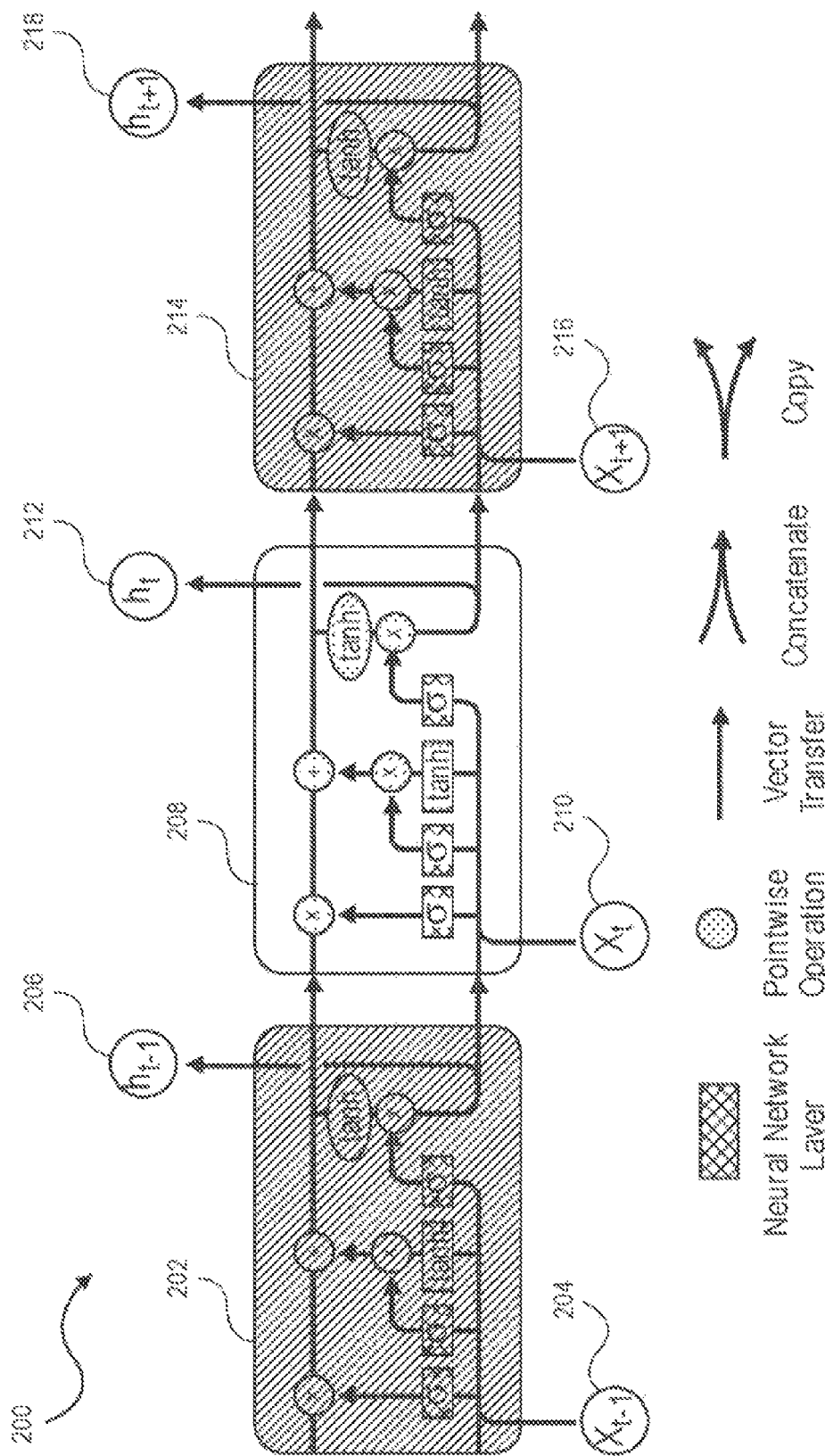
FIG. 2 illustrates a block diagram of an example of a recurrent neural network that can be used to implement a learner module of a dynamic learning authentication system, according to some embodiments.

FIG. 2 illustrates a block diagram of an example of a recurrent neural network that can be used to implement any of the (earner components in authentication system 100, according to some embodiments. It is noted that the recurrent neural network in FIG. 2 is one example of a machine learning algorithm, and that others may be used in embodiments of the invention. The recurrent neural network shown in FIG. 2 can be referred to as a Long Short Term Memory (LSTM) model 200 of the learning system. It should be understood that other recurrent neural network variants such as Gated Recurrent Units (GRUs) can also be used. A cell 208 of the model 200 can include an input 210 and an output 212 in addition to various layers and pointwise operations. Input 210 to the model 200 at time t is shown as Xi in FIG. 2. The inputs can correspond to the static and dynamic attributes gathered over time. Output 212 of the model 200 at time t is shown as $h_t$ in FIG. 2. The output 212 can correspond to the intermediary/latent outputs of the model 200 at time t.

The heuristic based initializer 110 can be used to initialize the weight matrices for the recurrent neural network implementing the dynamic learning authentication system 100. This can allow the neural network to be trained to develop a baseline for further training when implementing the online learning component 124. When the authentication system 100 observes that multiple users are using iris based authenticator over face-based authentication in low light environments, the authentication system 100 can add this rule to the authentication rule set 112. When adding a rule to the rule set, the authentication system 100 can refine the weight matrices of the recurrent neural network appropriately to reflect this. In some embodiments, the authentication system 100 can log the weight matrices of the recurrent neural network periodically from the user devices in a central environment, fine tune them based on similar users, and then push them back to user devices.

One benefit to using a recurrent neural network as the basis for the model 200 is that the recurrent neural network can consider time dependencies in its computations. As shown, the model can have a multiple cell, for instance, cells 202, 208, 214. Each cell can represent an iterative implementation of the model 200 at a specific time. For example, in addition to the aforementioned described cell 208 with input 210 and output 212, cells can exist for storing instances of previous neural network applications. Cell 202 of the model 200 can include an input 204 and an output 206 in addition to various layers and pointwise operations. Input 204 at time M is shown as $X_{t-1}$. Output 206 at time t–1 is shown as $h_{t-1}$. Cell 214 of the model 200 can include an input 216 and an output 218 in addition to various layers and pointwise operations. Input 216 at time t+1 is shown as $X_{t-1}$. Output 216 at time t+1 is shown as $h_{t+1}$. The cell 202 can correspond to the previous iteration of the recurrent neural network, and the cell 214 can correspond to the next iteration of the recurrent neural network.

As depicted in the cell 208 shown in FIG. 2, pointwise operations function similar to vector addition neural network layers can correspond to learned neural network layers. Additionally, merging lines can correspond to a concatenation of data, and separating lines can correspond to data being copied to use in subsequent processes throughout the cell 208 within the model 200.

It is to be understood that FIGS. 3-7 are describing the different states and functional operations of the cell 208 of the model 200.

Figure 3:
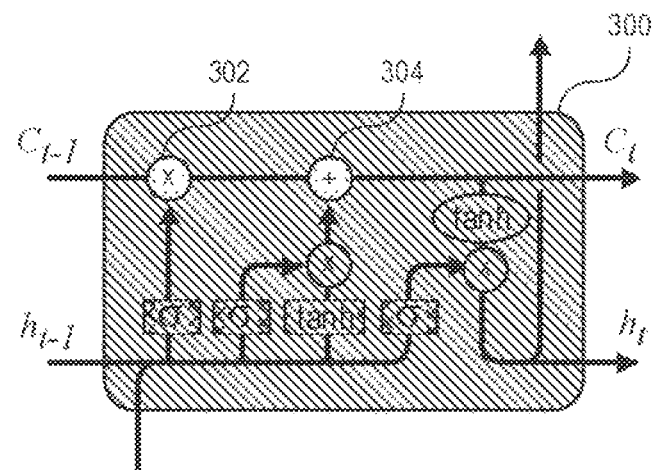
FIG. 3 illustrates an example of a cell state of recurrent neural network, according to some embodiments.

Different types of gates in an LSTM layer can facilitate modeling long term time dependencies (input, output and forget gate). FIG. 3 illustrates a cell state $C_t$ at each time state t that is maintained (e.g., in memory). This cell state is updated at each time step to predict the next authentication type given the current predicted authentication. The cell 300 can have pointwise operations 302, 304 to control the flow of the cell state $C_t$.

Figure 4:
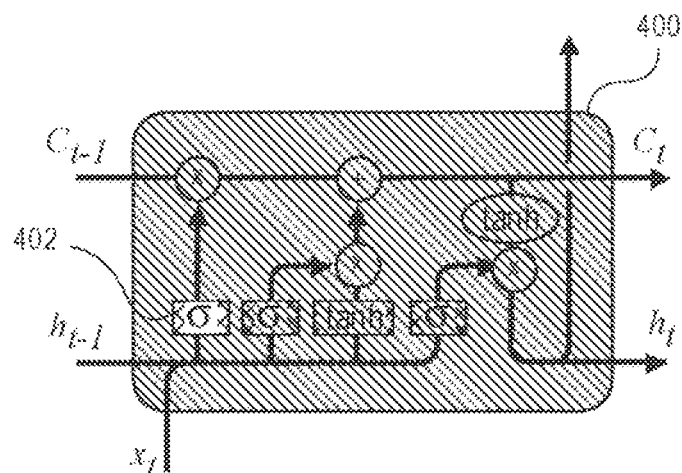
FIG. 4 illustrates an example of a forget gate of a recurrent neural network, according to some embodiments.

FIG. 4 illustrates a forget gate $f_t$ 402 of the cell 400 at time t for forgetting the information in the cell state $C_{t-1}$. The function of the forget gate can be represented as:

$$f_t = \sigma(W_f[h_{t-1}, x_t] + b_f)$$

The weight matrix $W_t$ determines the extent to which the cell state information is forgotten. $B_t$ is the bias added to the learning process. Note that sigmoid function to normalize between 0 and 1. For example, the weight matrix $W_t$ can determine if a previous attribute, rule, or any other type of input is less important in determining a preferred authentication type for the current cell state $C_t$, and therefore should be deemphasized or ignored altogether in the current determination of the output.

Figure 5:
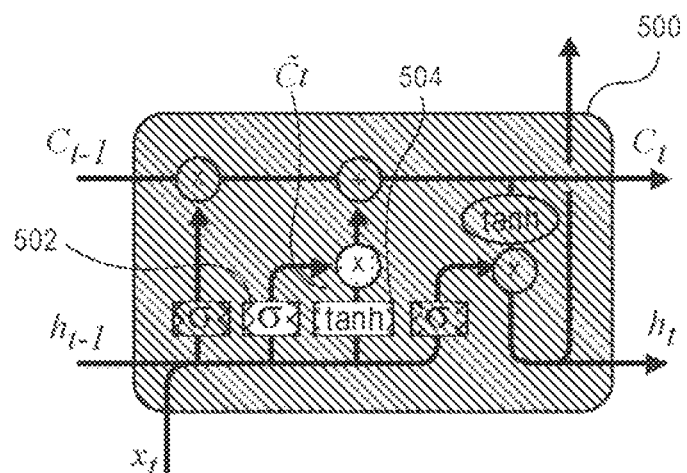
FIG. 5 illustrates an example of an input gate of a recurrent neural network, according to some embodiments.

FIG. 5 illustrates an input gate $i_t$ 502 of cell 500 that determines which values (e.g., attributes, preferences, etc.) to update in cell state $C_{t-1}$. $\tilde{C}_t$ 504 are the values to be added to the cell state $C_{t-1}$. The function of the input gate can be represented as:

$$i_t = \sigma(W_i \cdot [h_{t-1}, x_t] + b_i)$$

$$\tilde{C}_t = \tan h(W_C \cdot [h_{t-1}, x_t] + b_c)$$

Figure 6:
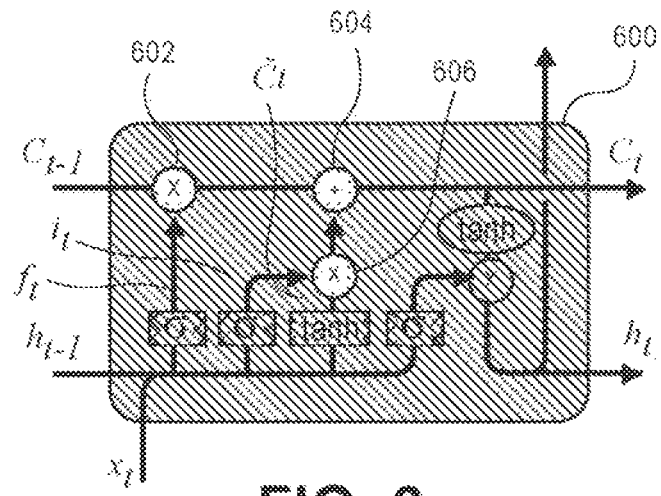
FIG. 6 illustrates an example of a forget gate and input gate of a recurrent neural network operating together, according to some embodiments.

FIG. 6 illustrates a forget gate and input gate operating together with $\tilde{C}_t$ to update the cell state of cell 600 using pointwise operations 602, 604, 606. The logic in FIG. 6 can be used to obtain $C_t$ from $C_{t-1}$. In other words, the current cell state $C_t$ is based on the previous cell state (e.g., for time-dependent determination of preferences and/or rules based on previously determined preferences and/or rules). The function shown m FIG. 6 can be represented as:

$$C_t = f_t * C_{t-1} + i_t * \tilde{C}_t$$

Figure 7:
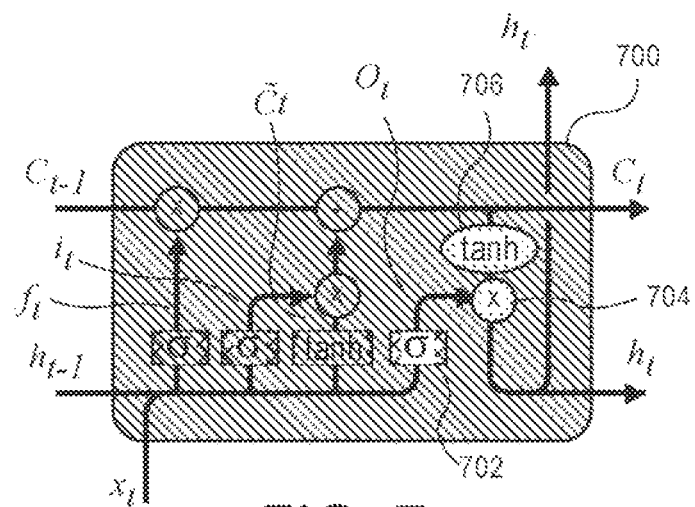
FIG. 7 illustrates an example of an output gate of a recurrent neural network, according to some embodiments.

FIG. 7 illustrates an output gate $o_t$ 702 of the cell 700 that determines, using pointwise operations 704, 706, the how the cell state $C_t$ will be filtered to reflect the output at current state $h_t$. The function of the output gate can be represented as:

$$o_t = \sigma(W_o[h_{t-1}, x_t] + b_o)$$

$$h_t = o_t * \tan h(C_t)$$

A backpropagation algorithm over time or its variants can be used to train the LSTM model 200. Various techniques for weight optimization can be used such as stochastic gradient descent, Adam algorithm, AdaDelta algorithm, or other suitable techniques.

Figure 8:
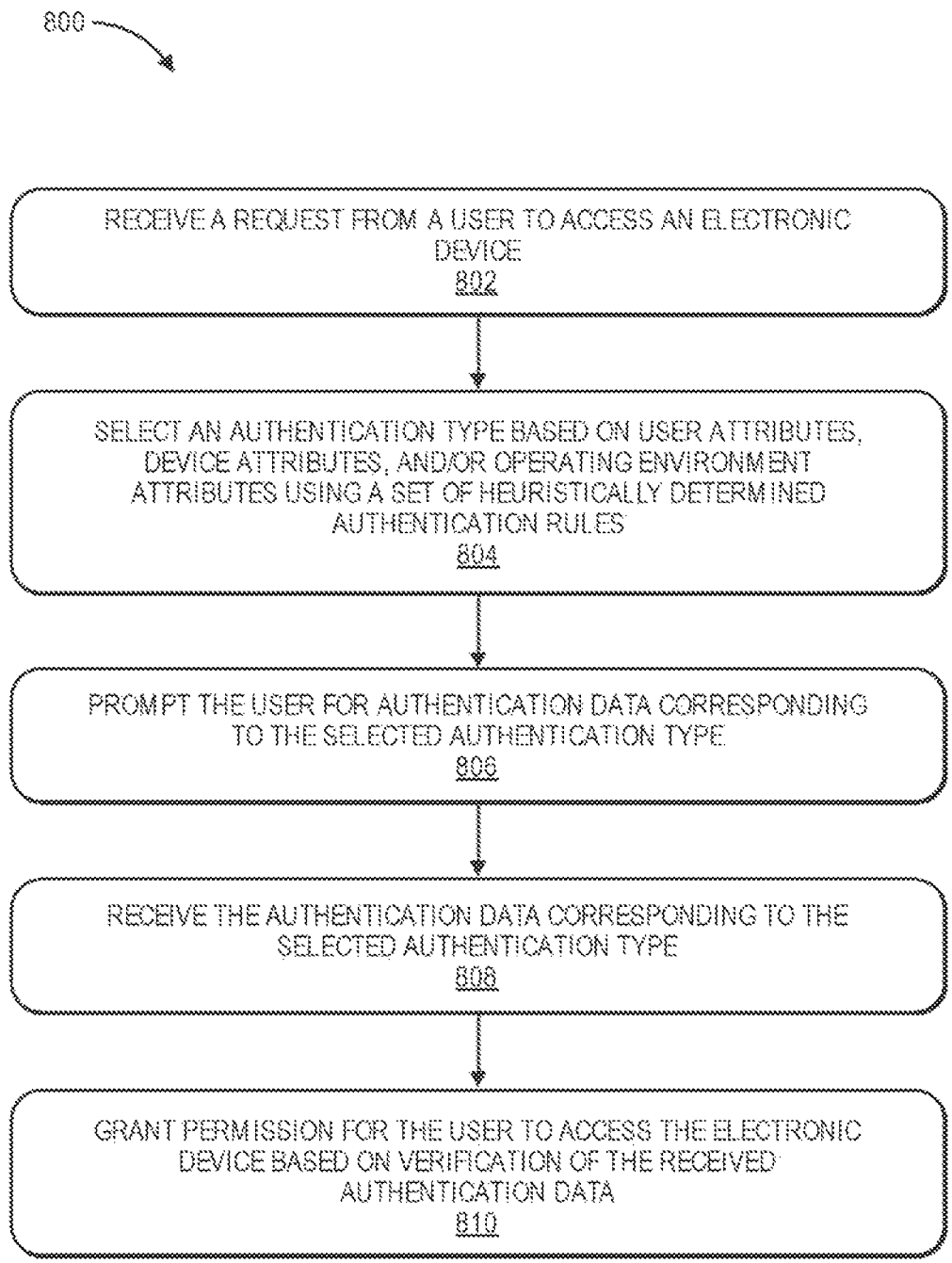
FIG. 8 illustrates a flow diagram of an example of a process for optimizing device authentication, according to some embodiments.

FIG. 8 illustrates a flow diagram of a process 800 for optimizing device authentication, according to some embodiments.

At block 802, a request from the user is received to access the user's electronic device. A user may be attempting to gain access to their electronic device, and, prior to being granted access, the user can be requested to provide authentication. When initiating an attempt to access the electronic device, the user can make a request that is received by the electronic device. Additional information regarding receiving a request from the user by the electronic device may be found above in reference to step S106 of FIG. 1.

At block 804, an authentication type is selected based on user attributes, device attributes, and/or operating environment attributes using a set of heuristically determined authentication rules In response to the request performed by the user in block 802, the electronic device, or a server computer in communication with the electronic device, can select an authentication type corresponding to attributes of the entity ecosystem 102 described in FIG. 1. Additional information regarding selecting an authentication type based on various attributes may be found above in reference to step S106 of FIG. 1.

At block 806, the electronic device prompts the user for authentication data corresponding to the selected authentication type. In response to the processes described in block 804, the electronic device can prompt the user for a type of the selected authentication, where the selected authentication is the best suited authentication type for the specific authentication event Additional information regarding prompting the user for authentication data may be found above in reference to step S106 of FIG. 1.

At block 808, the electronic device, receives the authentication data corresponding to the selected authentication type. A user can enter authentication data corresponding to the selected authentication in response to receiving a prompt from the electronic device as performed in block 806. Additional information regarding receiving the authentication data corresponding to the selected authentication type may be found above in reference to step S106 of FIG. 1.

At block 810, the electronic device grants permission for the user to access the electronic device based on verification of the received authentication data. The authentication data entered by the user in block 808 can be verified prior to the user being granted access to the electronic device. Upon verification, the electronic device can grant the user permission to access the electronic device. Additional information regarding granting permission to the user to access the electronic device may be found above in reference to step SI 06 of FIG. 1.

Figure 9:
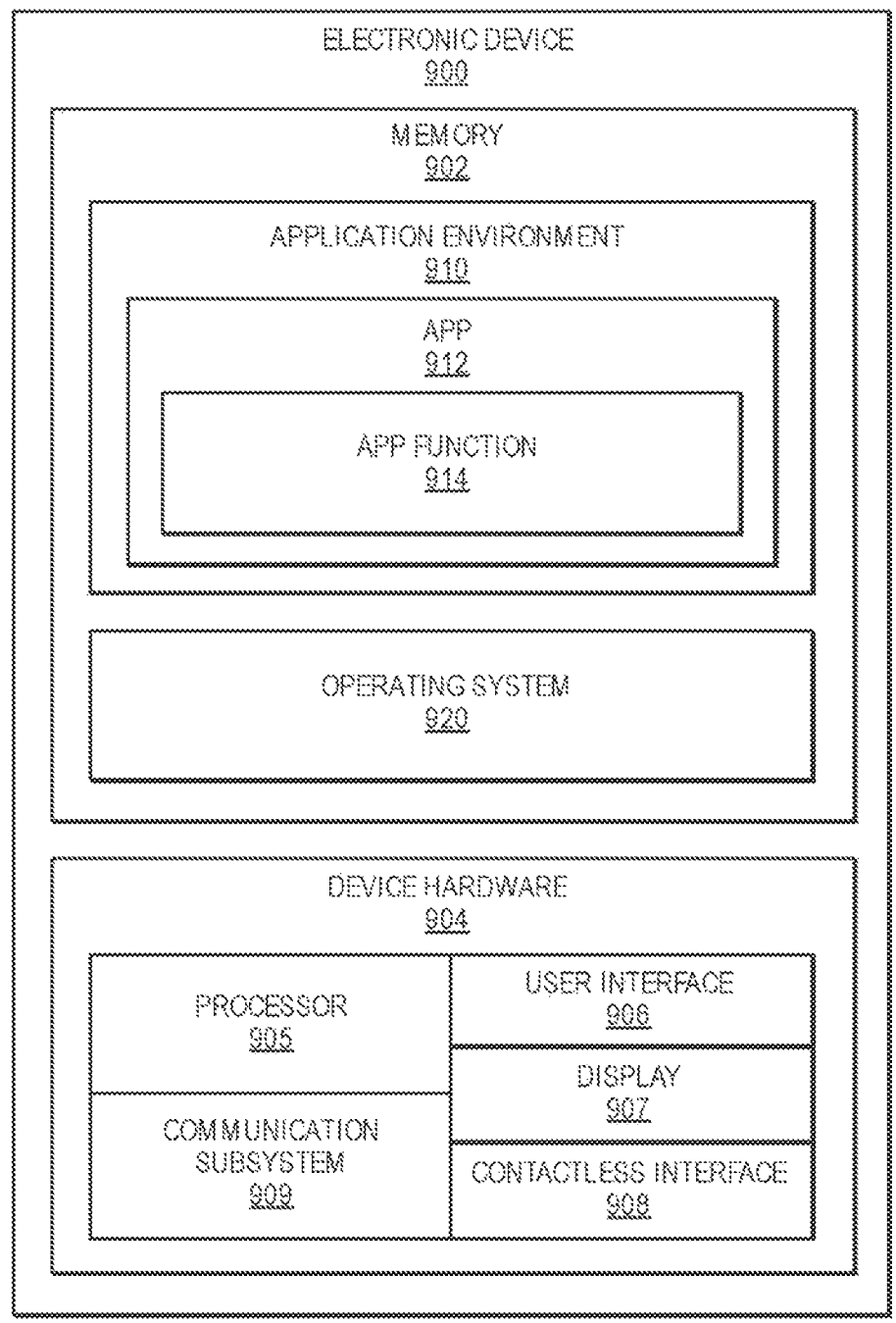
FIG. 9 illustrates a block diagram of an example of an electronic device, according to some embodiments.

FIG. 9 illustrates a block diagram of an example of an electronic device 900 that can employ the authentication techniques described herein, according to some embodiments. Electronic device 900 may include device hardware 904 coupled to a memory 902. Device hardware 904 may include a processor 905, a communication subsystem 909, user interface 906, a display screen 907 (which may be part of user interface 906), and a contactless interface 908. Processor 905 can be implemented as one or more integrated circuits (e.g., one or more single core or multicore microprocessors and/or microcontrollers), and is used to control the operation of electronic device 900. Processor 905 can execute a variety of programs in response to program code or computer-readable code stored in memory 902, and can maintain multiple concurrently executing programs or processes. Communications subsystem 909 may include one or more RF transceivers and/or connectors that can be used by electronic device 900 to communicate with other devices and/or to connect with external networks. User interface 906 can include any combination of input and output elements to allow a user to interact with and invoke the functionalities of electronic device 900. In some embodiments, display screen 907 may be part of user interface 906.

Contactless interface 908 may include one or more RF transceivers to interact with a contactless reader of an access device to conduct a transaction (e.g., payment transaction, access transaction, information exchange, etc.). In some embodiments, contactless interface 908 can be accessed by the operating system 920. In some embodiments, display screen 907 can also be part of contactless interface 908, and is used, for example, to perform transactions using QR codes, bar codes, etc.

Memory 902 can be implemented using any combination of any number of non-volatile memories (e.g., flash memory) and volatile memories (e.g., DRAM, SRAM), or any other non-transitory storage medium, or a combination thereof media. Memory 902 may store operating system 920 and an applications environment 910 where one or more application(s) 912 implementing application specific function(s) 914 reside. Examples of applications may include a transaction application (e.g., mobile wallet application, mobile banking application, mobile payments application, merchant application, web browser, etc.) to be executed by processor 905.

In some embodiments, the electronic device 900 can be a user device or server device/computer as previously described. For example, the user device can include the memory 902 to store entity ecosystem attributes, rule sets, authentication data, or other information useful in implementing the examples. The memory device 900 as implemented on the user device can implement the functions as described in the examples.

In some embodiments, the invention can include an electronic device comprising a processor, and a computer readable medium. The computer readable medium comprising code executable by the processor for implementing a method comprising: receiving, by an electronic device, a request from a user to access the electronic device, selecting, by the electronic device or server computer in communication with the electronic device, an authentication type based on user attributes, device attributes, and/or operating environment attributes using a set of heuristically determined authentication rules; prompting, by the electronic device, the user for authentication data corresponding to the selected authentication type; receiving, by the electronic device, the authentication data corresponding to the selected authentication type; and granting, by the electronic device, permission for the user to access the electronic device based on verification of the received authentication data.

In some embodiments, the authentication techniques described herein can be used to select a suitable authentication mechanism to allow the user of electronic device 900 to conduct a transaction. For example, proper authentication of the user may be required before electronic device 900 provides account credentials to an access device to conduct a transaction. In some embodiments, an indicator identifying the selected authentication type can also be provided to the access device, and be included in an authorization request message used to request authorization for the transaction. In response to the authorization request message, an authorizing entity may respond with an authorization response message indicating whether the transaction is approved or denied. In some embodiments, the authorization decision can be based in part on the selected authentication mechanism.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #. Objective-C. Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in Sight of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

IV. REFERENCES

[1] Hochreiter. Sepp, and Jurgen Schmidhuber. "Long short-term memory." *Neural computation* 9.8 (1997): 1735-1780.
[2] Chung, Junyoung, et al. "Gated feedback recurrent neural networks." *International Conference on Machine Learning* 2015.
[3] Kingma, Diederik, and Jimmy Ba. "Adam: A method for stochastic optimization." arXiv preprint arXiV:1412.6980 (2014).
[4] Zeiler. Matthew D. "ADADELTA: an adaptive learning rate method." arXiv preprint arXiv:1212.5701 (2012)
[5] Olah. Christopher, et al. "Understanding LSTM Networks" http://colah.github.io/posts/2015-08-Understanding-LSTMs/(2015)

What is claimed is:

1. A computer-implemented method for organizing device authentication, the method comprising:
    gathering, by an electronic device, device attributes comprising information about the electronic device, user attributes comprising information about user preferences and authentication activity, and operating environment attributes comprising information about ambient light and sound;
    receiving, by the electronic device, a request from a user to access the electronic device;
    selecting, by the electronic device or a server computer in communication with the electronic device, an authentication type based on the user attributes, the device attributes, and the operating environment attributes using a set of heuristically determined authentication rules determined using an online learning component comprising a user specific learner that learns authentication rules applicable to the user based on the user attributes and a cluster specific learner that learns behavior from a set of similar users using dynamic attribute based entity clustering to modify the authentication rules learned by the user specific learner based on the behavior of the set of similar users, wherein the user specific learner and the cluster specific learner include separate neural networks and wherein an output of the user specific learner is attributed a first weight and an output of the cluster specific learner is attributed a second weight different from the first weight;
    prompting, by the electronic device, the user for authentication data corresponding to the selected authentication type;
    receiving, by the electronic device, the authentication data corresponding to the selected authentication type; and
    granting, by the electronic device, permission for the user to access the electronic device based on verification of the received authentication data.

2. The method of claim 1, further comprising:
    modifying the set of heuristically determined authentication rules based on authentication activities of other users, wherein the heuristically determined authentication rules are dynamically evolving.

3. The method of claim 1, wherein the online learning component comprises a generic learner.

4. The method of claim 1, wherein the separate neural networks include a recurrent neural network such as a Long Short Term Memory (LSTM) or a Gated Recurrent Unit (GRU).

5. The method of claim 1, wherein the user specific learner and the cluster specific learner are attributed the weights based on the user attributes, the device attributes, and/or the operating environment attributes.

6. The method of claim 1, wherein the attribute based entity clustering comprises: k-means clustering, rank-order clustering, or hierarchical clustering.

7. A system comprising:
    an electronic device comprising a processor, and a computer readable medium, the computer readable medium comprising code executable by the processor for implementing a method comprising:
    gathering, by the electronic device, device attributes comprising information about the electronic device, user attributes comprising information about user preferences and authentication activity, and operating environment attributes comprising information about ambient light and sound;
    receiving, by the electronic device, a request from a user to access the electronic device;
    selecting, by the electronic device or a server computer in communication with the electronic device, an authentication type based on the user attributes, the device attributes, and the operating environment attributes using a set of heuristically determined authentication rules determined using an online learning component comprising a user specific learner that learns authentication rules applicable to the user based on the user attributes and a cluster specific learner that learns behavior from a set of similar users using dynamic attribute based entity clustering to modify the authentication rules learned by the user specific learner based on the behavior of the set of similar users, wherein the user specific learner and the cluster specific learner include separate neural networks and wherein an output of the user specific learner is attributed a first weight and an output of the cluster specific learner is attributed a second weight different from the first weight;
    prompting, by the electronic device, the user for authentication data corresponding to the selected authentication type;
    receiving, by the electronic device, the authentication data corresponding to the selected authentication type; and
    granting, by the electronic device, permission for the user to access the electronic device based on verification of the received authentication data.

8. The system of claim 7, wherein the method further comprises:
    modifying the set of heuristically determined authentication rules based on authentication activities of other users.

9. The system of claim 7, wherein the online learning component comprises a generic learner.

10. The system of claim 7, wherein the user specific learner and the cluster specific learner are attributed the weights based on the user attributes, the device attributes, and/or the operating environment attributes.

11. The system of claim 7, wherein the attribute based entity clustering comprises: k-means clustering, rank-order clustering, or hierarchical clustering.

12. The system of claim 7, wherein the separate neural networks include a recurrent neural network comprising an LSTM.

13. A method comprising:
    receiving, by a processor, user attributes comprising information about user preferences and authentication activity of a user, device attributes comprising information about an electronic device, and operating environment attributes comprising information about ambient light and sound associated with a plurality of electronic devices;

determining by the processor, an authentication model comprising a set of heuristically determined authentication rules determined using an online learning component comprising a user specific learner that learns authentication rules applicable to the user based on the user attributes and a cluster specific learner that learns behavior from a set of similar users using dynamic attribute based entity clustering to modify the authentication rules learned by the user specific learner based on the behavior of the set of similar users, wherein the user specific learner and the cluster specific learner include separate neural networks and wherein an output of the user specific learner is attributed a first weight and an output of the cluster specific learner is attributed a second weight different from the first weight; based at least upon the user attributes, the device attributes, and/or the operating environment attributes, receiving, by the processor, a request to access the electronic device; and selecting a type of authentication based upon the request and the authentication model.

14. The method of claim 13, further comprising:
modifying the set of heuristically determined authentication rules based on authentication activities of other users.

15. The method of claim 13, wherein the online learning component comprises a generic learner.

16. The method of claim 13, wherein the separate neural networks include a recurrent neural network comprising an LSTM.

17. The method of claim 13, wherein the attribute based entity clustering comprises: k-means clustering, rank-order clustering, or hierarchical clustering.

* * * * *